Aug. 30, 1927.

M. J. B. BARBAROU 1,640,973

LUBRICATING ARRANGEMENT FOR INTERNAL COMBUSTION OR LIKE ENGINES

Filed Feb. 28. 1925

Marius Jean Baptiste Barbarou,
INVENTOR:
By Otto Munk
his Attorney.

Patented Aug. 30, 1927.

1,640,973

UNITED STATES PATENT OFFICE.

MARIUS JEAN BAPTISTE BARBAROU, OF PARIS, FRANCE.

LUBRICATING ARRANGEMENT FOR INTERNAL-COMBUSTION OR LIKE ENGINES.

Application filed February 28, 1925, Serial No. 12,326, and in France April 22, 1924.

My invention relates to an arrangement for the lubrication of internal combustion or like engines through a revoluble tubular shaft of the engine for example, the crank-shaft or the camshaft, which comprises a recess or groove in the bearing supporting the end of the shaft, said recess being in constant communication with the source of oil under pressure, and a radial aperture formed in the tubular wall of the said shaft and insuring at each revolution the communication between the inner capacity of said shaft and the said recess, during a fraction of a revolution which depends upon the diameter of the shaft and also upon the length of the arc through which the said recess extends upon the tubular shaft.

The characteristic features of the invention will be set forth in the following description with reference to the appended drawing which shows an example of application of the invention to the case of a camshaft.

Figure 1:
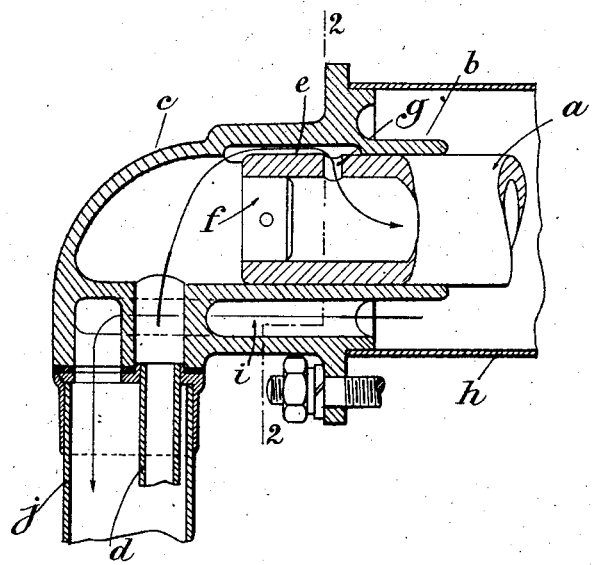
Figure 2:
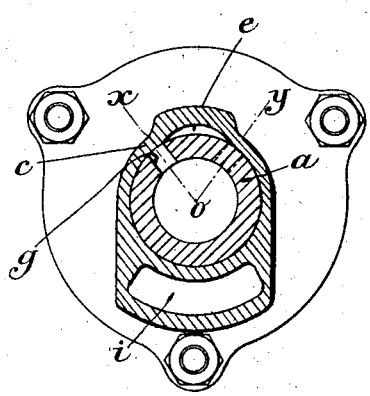

Fig. 1 is an axial section of the lubricating arrangement,

And Fig. 2 is a cross section of the same along the line 2—2 (Fig. 1).

In the drawing, $a$ indicates the tubular cam shaft of the engine which is supported at its end in the bearing $b$ formed integral with the case $c$. The said case communicates with a tube $d$ through which the oil is supplied under pressure by any known means, not shown. In the internal wall of the bearing $b$ is formed a groove or recess $e$ of such length that the end of the shaft $a$ shall be appreciably in the rear of the end of the said recess. The recess is thus in constant communication with the interior of the case $c$ which is filled with oil. The end of the shaft is closed by a suitable plug $f$, and its tubular wall is pierced with a radial aperture $g$, the axis of which is disposed in a plane crossing the said recess, this plane being the one upon which the section is taken as shown in Fig. 2. At each revolution of the shaft $a$, the interior of the said shaft will be connected with the groove $e$ during the whole period in which the axis of the aperture $g$ is situated within the angle $x\ o\ y$ (Fig. 2), and during this period the oil under pressure will proceed from the groove $e$ into the shaft $a$ acting as a collecting chamber, whence the oil will be conducted to the various parts to be lubricated such as bearings and the like.

The amount of oil entering the shaft $a$ will depend on the one hand upon the pressure of the oil, and on the other hand upon the width of the said recess and the diameter of the aperture $g$; by suitably determining these dimensions, the time during which the oil may enter the shaft $a$ may be exactly determined, so that the quantity of oil may be limited to the amount necessary for the lubrication, thereby obviating all excess of pressure and consequent leakage.

It will be observed that if the speed of rotation of the shaft $a$ is variable, the ratio of the time during which the oil is admitted into the said shaft to the duration of a complete revolution will have a constant value, equal to $\dfrac{x\ o\ y}{2\ \pi}$.

The device according to the invention is advantageous in that it obviates the use of a calibrated duct for limiting the quantity of oil delivered to the points to be lubricated, since the diameter of the aperture $g$ can be made sufficiently large in order to prevent all obstruction.

The oil discharged from the lubricated parts is lead to a casing $h$ from which it flows into the tube $j$ through the conduit $i$ provided in the case $c$; the oil proceeds through the tube $j$ to the oil pump or the like not shown, whence it is discharged under pressure by the tube $d$.

In the case of a crankshaft, the casing $h$, the tube $j$ and the conduit $i$ will be dispensed with.

Having now described my invention, what I claim as new and desire to secure by Letters Patent is:

1. In combination with the lubricating system of an engine with oil under pressure and having a hollow shaft: a bearing supporting one end of said shaft, a chamber formed in said bearing beyond said end of said shaft, and in communication with the oil supply, a longitudinal groove formed partly in the inner surface of said bearing and along said shaft and partly in the wall of said chamber, and an aperture through the wall of said shaft, the length of the arc through which said groove extends upon the hollow shaft, and the diameter of said aperture being so determined as to limit the quantity of lubricant to the amount strictly necessary for the lubrication, whereby all excess of pressure as well as leakage will be obviated, said aperture having besides a sufficient diameter to prevent all obstruction of the same.

2. In combination with the lubricating system of an engine with oil under pressure and having a hollow camshaft: a bearing supporting one end of said camshaft, a chamber formed in said bearing beyond said end of said camshaft and in communication with the oil supply, a cylindrical casing surrounding said cam-shaft, an oil outlet conduit surrounding said oil supply and communicating with said cylindrical casing, a longitudinal groove formed partly in the inner surface of said bearing and along said camshaft and partly in the wall of said chamber, and an aperture through the wall of said camshaft, the length of the arc through which said groove extends upon the hollow camshaft, and the diameter of said aperture being so determined as to limit the quantity of lubricant to the amount strictly necessary for the lubrication, whereby all excess of pressure as well as leakage will be obviated, said aperture having besides a sufficient diameter to prevent all obstruction of the same.

In testimony whereof I have signed my name to this specification.

MARIUS JEAN BAPTISTE BARBAROU.